UNITED STATES PATENT OFFICE.

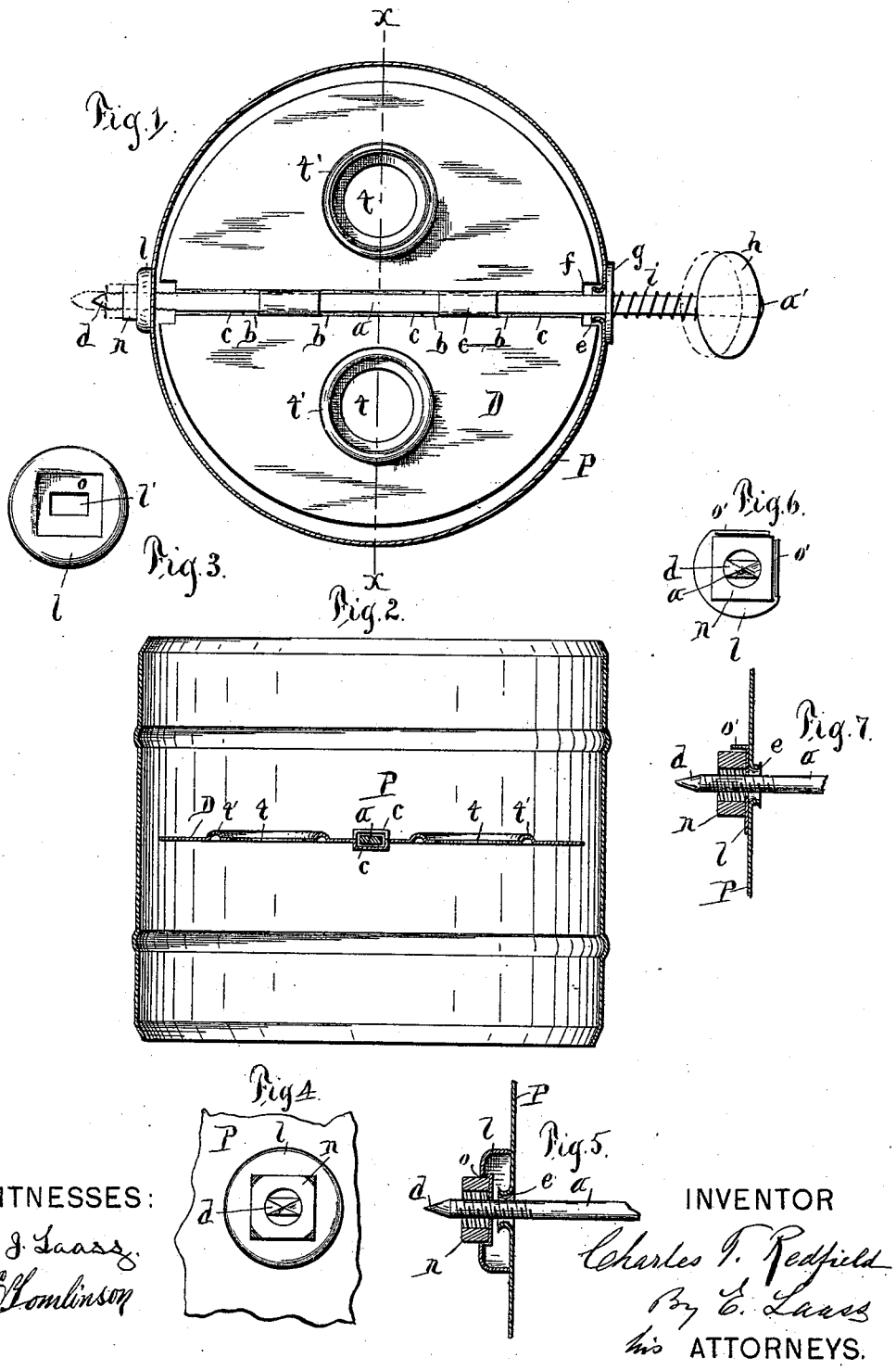

CHARLES T. REDFIELD, OF GLEN HAVEN, NEW YORK.

DAMPER.

SPECIFICATION forming part of Letters Patent No. 536,443, dated March 26, 1895.

Application filed December 12, 1894. Serial No. 531,572. (No model.)

*To all whom it may concern:*

Be it known that I, CHARLES T. REDFIELD, of Glen Haven, in the county of Cayuga, in the State of New York, have invented new and useful Improvements in Stovepipe-Dampers, of which the following, taken in connection with the accompanying drawings, is a full, clear, and exact description.

This invention has more particularly reference to the stove pipe damper for which I have obtained United States Letters Patent No. 502,203, dated July 25, 1893.

My present invention consists in an improved construction of the damper and its attachment to the stove-pipe as hereinafter described and specifically set forth in the claims.

In the annexed drawings, Figure 1 is a plan view of my improved damper showing by dotted lines the method of releasing it from the nut-lock. Fig. 2 is a transverse section on line —X—X— in Fig. 1. Fig. 3 is an enlarged detached face view of the nut-lock washer. Fig. 4 shows the same with the damper shaft and nut. Fig. 5 is a transverse section of the same. Fig. 6 is a face view of a modification of the nut-locking washer. Fig. 7 is a transverse section thereof.

Similar letters of reference indicate corresponding parts.

—P— represents a section of pipe which may be employed for conducting smoke from a stove or furnace, or for conveying hot air or other analogous purposes, and —D— denotes the damper which latter I prefer to form of sheet-iron stamped out by means of suitable dies.

—a— is the shaft of the damper. This shaft is formed of squared or flattened wire and secured to the damper by passing through perforations —b—b— and alternately under and over intervening bands —c—c— pressed in opposite directions from the plane of the damper-disk. The perforations and depressions in the damper are shaped to correspond to the cross-section of the shaft and thus the damper is compelled to rotate with the shaft, which however is permitted to be shifted longitudinally in its connection with the damper.

The damper-shaft passes through perforations in opposite sides of the pipe —P— and in order to facilitate the operation of attaching the damper to the pipe, I form one end of the damper-shaft with a tapering point —d— to allow the shaft to be used as a punch for piercing the sides of the pipe and making the necessary holes for the reception of the damper-shaft, and also to guide the shaft through the damper in the operation of connecting said parts. In thus piercing the pipe, burrs —e—e— are formed around the perforations. By making the perforations from one side of the pipe the burr at one side of the pipe projects inward and the burr at the opposite side of the pipe projects outward. To prevent the inward projecting burr from interfering with the damper, I cut in the edge of the latter the notch —f— as shown in Fig. 1 of the drawings. One end of the shaft is provided with the wooden handle —h— and in order to allow the shaft to be driven through the pipe by blows of a hammer on the end of the shaft without danger of splitting the handle —h—, I extend the shaft through the handle as indicated by dotted lines in Fig. 1 of the drawings, and terminate it with a protruding head —a'— for the reception of the aforesaid blows. Between this handle and a washer —g— on the side of the pipe I place the spiral spring —i— which surrounds the shaft and in conjunction with the shaft-retainer on the opposite end of the shaft, exerts sufficient pressure on the washer to cause the frictional contact of the latter with the pipe to retain the damper in the various angles to which it may be adjusted. The opposite protruding end of the damper-shaft is screw-threaded and passes through a washer —l— on the exterior of the pipe. The eye —l'— in this washer is polygonal or angular to correspond to the cross section of the damper-shaft as shown in Fig. 3 of the drawings and by that means the washer is locked on the shaft so as to compel it to turn therewith. To prevent the outward projecting burr around the perforation in the pipe from interfering with said washer, I form the latter cup-shaped and place it with its hollow or concaved side toward the pipe as illustrated in Fig. 5 of the drawings. To the end of this shaft is applied a nut —n— to retain the shaft properly connected to the pipe. To prevent this nut from working accidentally loose on the shaft, I lock said nut on the washer —l— which is locked on the shaft as aforesaid. This locking of the nut is effected by suitable shoulders which may be formed either by turning up the edge or edges of the washer after the nut is seated on the washer as shown at —o'— in Figs. 6 and 7 of the drawings, or by forming the washer with an angular recess —o— in its outer face as represented in Figs. 4 and 5 of the drawings, said recess being of the same shape and size as the nut —n— which is seated therein.

To tighten the nut so as to obtain the requisite tension of the spring —i— for the purpose hereinafter stated, the operator pushes the damper-shaft longitudinally by pressing on the handle —h— while applying a corresponding resistance to the side of the pipe at the opposite end of the shaft. The spring —i— yields and allows the shaft to move endwise so to cause the nut —n— to be carried out of its seat on the washer —l— as indicated by dotted lines in Fig. 1 of the drawings. The nut can then be turned farther onto the shaft and reseated on the washer —l— by relieving the shaft of the aforesaid pressure when the resilience of the spring —i— will cause the shaft to be retracted.

—t—t— designate two holes punched in the damper at opposite sides of the shaft —a— for the purpose of guarding against completely closing the pipe. Said holes are surrounded by annular bosses —t'—t'— which are struck up from the plane of the damper-disk and serve to stiffen the same and prevent the warping thereof.

What I claim as my invention is—

1. In combination with a stove-pipe or analogous pipe, a damper having its shaft formed angular in cross section and screw-threaded at one end, a washer provided with a corresponding angular eye for the reception of said shaft and formed with an angular recess in its outer face, the nut seated in said recess, and a spring forcing the shaft longitudinally to normally retain the nut in said recess when required as set forth.

2. The combination with a stove-pipe having in its side a perforation with outward projecting burrs around said perforation, a damper in said pipe, the damper-shaft passing through the aforesaid perforation, a cup-shaped washer on the shaft and receiving in it the burr of the perforation, and a shaft-retainer on the protruding end of the shaft as set forth.

In testimony whereof I have hereunto signed my name this 17th day of November, 1894.

CHARLES T. REDFIELD. [L. S.]

Witnesses:
J. J. LAASS,
C. L. BENDIXON.